(12) United States Patent
Völckers

(10) Patent No.: US 7,583,206 B2
(45) Date of Patent: Sep. 1, 2009

(54) DEVICE FOR INPUTTING TEXT BY ACTUATING KEYS OF A NUMERIC KEYPAD FOR ELECTRONIC DEVICES AND METHOD FOR PROCESSING INPUT IMPULSES DURING TEXT INPUT

(76) Inventor: Oliver Völckers, Im Kirschengarten 26, Trier D-54294 (DE)

( * ) Notice: Subject to any disclaimer, the term of this patent is extended or adjusted under 35 U.S.C. 154(b) by 591 days.

(21) Appl. No.: 10/502,871

(22) PCT Filed: Jan. 16, 2003

(86) PCT No.: PCT/EP03/00417

§ 371 (c)(1),
(2), (4) Date: Dec. 7, 2004

(87) PCT Pub. No.: WO03/067409

PCT Pub. Date: Aug. 14, 2003

(65) Prior Publication Data

US 2007/0139359 A1    Jun. 21, 2007

(30) Foreign Application Priority Data

Feb. 2, 2002   (DE) ................................ 102 40 379

(51) Int. Cl.
*H03M 11/00* (2006.01)
(52) U.S. Cl. .................... 341/23; 345/168; 345/169; 200/341; 341/22; 341/34
(58) Field of Classification Search .................. 341/20, 341/22, 23, 26, 34; 345/168, 169; 200/341
See application file for complete search history.

(56) References Cited

U.S. PATENT DOCUMENTS

| 5,528,235 | A  | * | 6/1996  | Lin et al. ...................... 341/22 |
| 6,157,323 | A  | * | 12/2000 | Tso et al. ...................... 341/22 |
| 6,201,468 | B1 | * | 3/2001  | DeVolpi ........................ 338/47 |
| 7,271,361 | B2 | * | 9/2007  | Sugimura et al. ........... 200/341 |
| 2001/0003539 | A1 | | 6/2001 | Hahm et al. |

FOREIGN PATENT DOCUMENTS

| EP | 1 022 649 A1 | 1/2000 |
| WO | WO 99/44212 | 9/1999 |
| WO | WO 01/20573 A1 | 3/2001 |

* cited by examiner

*Primary Examiner*—Albert K Wong
(74) *Attorney, Agent, or Firm*—Norris McLaughlin & Marcus, PA; Bruce S. Londa, Esq.

(57) ABSTRACT

The aim of the invention is to provide a device for inputting text by a single actuation of a key on a numerical keypad and a method for processing input impulses for portable electronic devices comprising a display. To achieve this, sensors that measure the finger position of the operator on the key are located under each key and control electronics, which evaluate said position and assign the latter to one of the possible input options, are provided. During the actuation of a key on the keypad, a list containing the possible input options appears on the display and a single input option that corresponds with each respective actuation position is highlighted by a block. The actuation position can be modified during actuation, thus displacing the highlighting at will onto the displayed input options. When the respective key is released, the input option that was last highlighted is registered as the keyed input.

22 Claims, 5 Drawing Sheets

Figure 1:
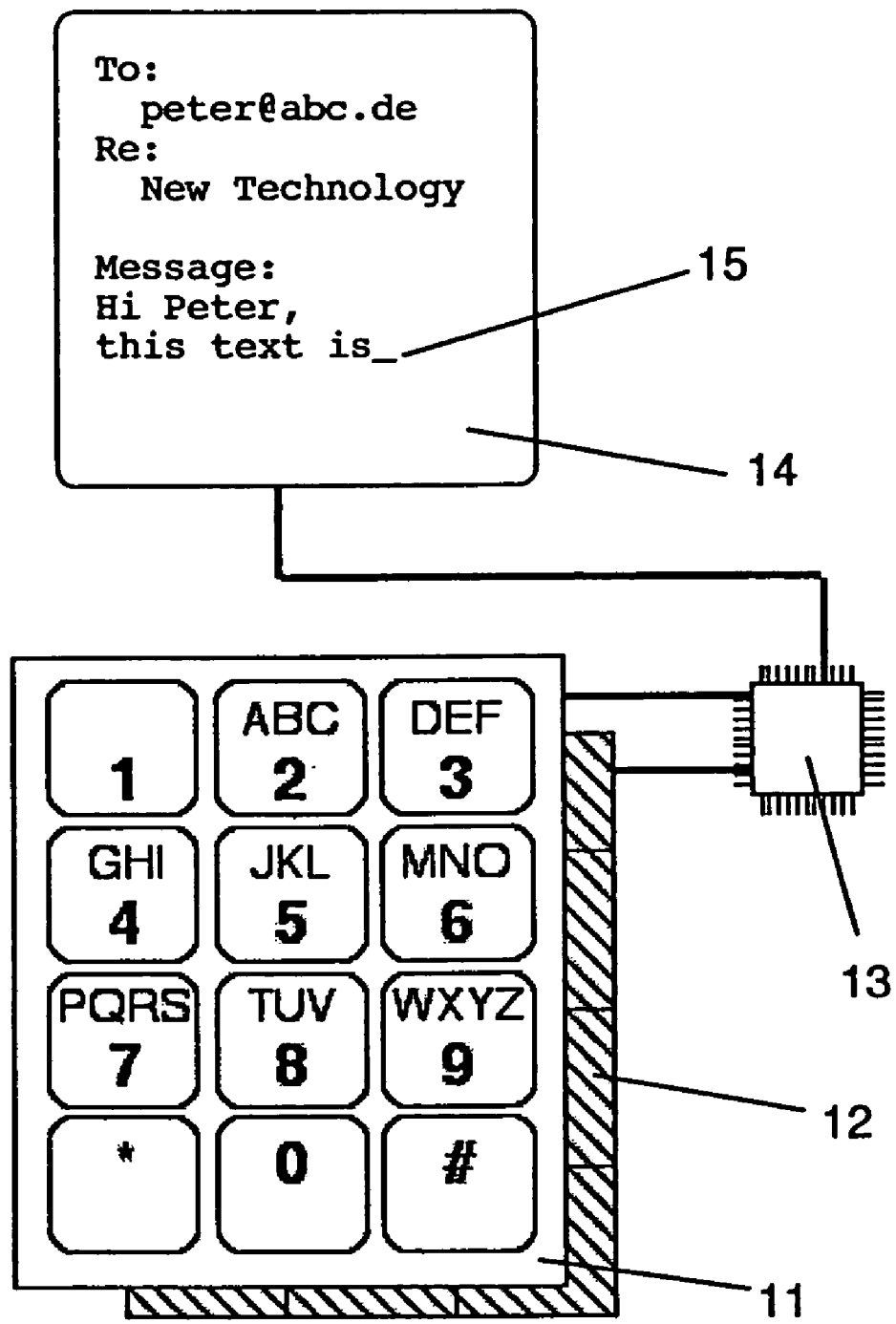

Fig. 2
a)
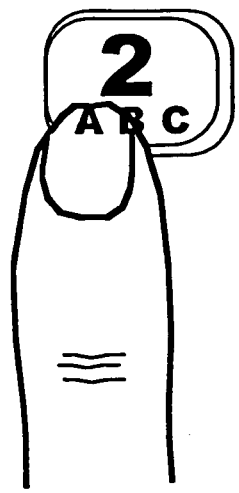
b)
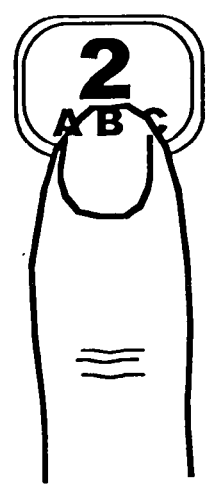
c)
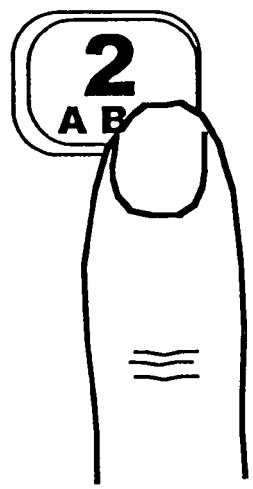

Fig. 3
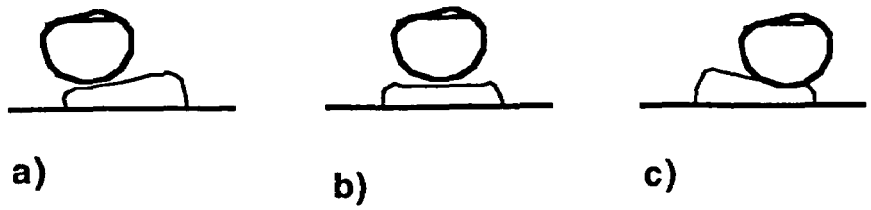
a)  b)  c)
Fig. 4
a)
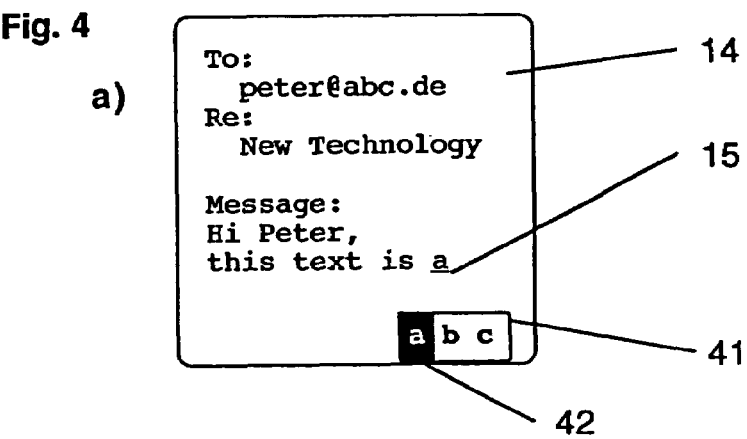
b)
c)

Fig. 5

| Key | L | M | | R |
|---|---|---|---|---|
| 2 | a | b | | c |
| 3 | d | e | | f |
| 4 | g | h | | i |
| 5 | j | k | | l |
| 6 | m | n | | o |
| 7 | p | q | r | s |
| 8 | t | u | | v |
| 9 | w | x | y | z |

Fig. 6  a)                                         b)

| T | ◄ | , . ! | ; : ? |
|---|---|---|---|
| R | 1 | 2 | 3 |
|   | ( " ) | % / § | < = > |
|   | 4 | 5 | 6 |
| M | − | ' | + |
| B | 7 | 8 | 9 |
| t | @ | − | ¿ |
|   | * | 0 | # |

61 — (left figure)

| T | ◄ | À Ä Ç | È € É |
|---|---|---|---|
| R | 1 | 2 | 3 |
|   | Ì ì | Å Æ £ | Ø Ñ Ö |
|   | 4 | 5 | 6 |
| M | ß $ | Ü ù | ¥ |
| B | 7 | 8 | 9 |
| t | * | 0̄ | # |

62 — (right figure)

14 —

Fig. 7

| Nr. | Sensor Type | Component Count | Measurement | Output | Resolution |
|---|---|---|---|---|---|
| 71 | rocker switch | 3 | Position | digital | 3 |
| 72 | force sensing resistors | 2 | 2x Force | analog | >50 |
| 73 | FSR, lin. potentiometer | 1 | Force + Position | analog | >50 |
| 74 | strain gauges | 2 | 2x Force | analog | >100 |
| 75 | hall sensors | 2 | 2x Distance | analog | >100 |
| 76 | multi-switch | 2-30 | Angle | digital | 3-30 |
| 77 | membrane keyboard | 3-4 | Position | digital | 3-4 |
| 78 | deformable keys | 3-10 | Force + Position | analog | 3-10 |

DEVICE FOR INPUTTING TEXT BY ACTUATING KEYS OF A NUMERIC KEYPAD FOR ELECTRONIC DEVICES AND METHOD FOR PROCESSING INPUT IMPULSES DURING TEXT INPUT

This application is a 371 of PCT/EP03/00417, filed Jan. 16, 2003.

The invention describes an apparatus for text input by activation of keys of a numeric keypad that are labelled in the typical way of mobile phones with multiple letters per key, where the keys detect the position of the finger on the activated key by means of special sensors; it also describes a procedure that associates the finger position with a certain character from the possible input alternatives.

Numeric keypads are widely in use with electronic devices such as mobile phones, photo copiers, automated teller machines, video recorder remote controls, audio players and many more. The increasing number of functions leads to a growing demand for text input functions on the basis of these numeric keypads. There are some solutions available for this task:

telephones with a text display are typically equipped with the "multi-tap" function. The keys 2 to 9 are labelled with the letters A-Z in a way that every key is labelled with 3 or 4 letters. In order to enter text, letters can be typed by activating the corresponding key repeatedly. For instance, the key 6 is labelled with the letters MNO. A single key press leads to an M, a double keypress results in an N and pressing the key three times produces the letter O. While this multi-tap input scheme is tedious, it does not require any special hardware, so it comes as a standard with mobile phones.

Predictive Text Input systems complement the ordinary keyboard with a software control with a dictionary supporting several languages. The redundancy of written text is then utilized to guess the intended word from a sequence of single key presses. For example, if the key 1 is pressed twice and the key 3 is pressed once, then 3*3*3=27 possible input sequences would be possible, i.e. all combinations of one letter each from "ABC", "ABC" and "DEF". However, from these various possibilities most sequences do not result in a meaningful word, such as "BBF", "CBD", "AAE". The system assumes in this case on the basis of the dictionary, that the word "BAD" was intended and offers it for confirmation.

Some manufacturers of mobile phones and organizers try to avoid the problem by offering additional, external keyboards with a standard typewriter arrangement as an accessory.

The multi-tap scheme has been a standard equipment of mobile and cordless phones, because it requires only minimal technical resources. In addition, it allows to use the same key arrangement internationally, while typewriter keyboards and PC keyboards must be localized. Although the multi-tap scheme is wide spread, it is not very convenient for text entry due to the large number of key taps with special operation requirements for fluid input. It is only a makeshift solution for entering short character sequences.

Each of the digit keys 2 to 9 is labelled with three or four letters of the alphabet. In order to enter a certain character, the corresponding digit key must be pressed several times within a brief time span. As the keys are not only assigned letters, but also special characters, umlauts etc., a single character input may require between three and fifteen key presses.

For instance, to enter the letter "S", the key "7" must be pressed four times in a row within a short time. If this input is given too slowly or the key is pressed only three times, the letter "R" appears instead. Correcting such typing errors is tedious; the wrong letter must be erased by pressing the delete key and the correct character must be entered again.

The same digit key "7" is also used to enter the letter "P". Pressing this key twice slowly results in "PP", a slightly faster input of the same sequence results in a "Q". Such multiple assignments and invisible extra characters such as umlauts and the timing requirements slow down the operation significantly, they make text input more difficult and lead to various typing errors.

In a variation of the multi-tap scheme, a spring-loaded button is located at the edge of the left side of a mobile phone. This button can be slided to the top or bottom. As an alternative to the normal multi-tap input scheme, the second or third letter of a digit key can be directly accessed if the spring-loaded button is shifted up or down during the activation of the digit key. With some training, this indeed improves text input speed. However, this method requires additional concentration and both hands. For this reasons, this variation has not prevailed.

Predictive text input is adequate for short text messages (short message service, SMS) of mobile phones. However, they are only useful if the entered text is covered by the dictionary of the software. So this word prediction methods are helpful for entering sentences of natural language, but not for entering names, addresses and abbreviations. Word prediction systems can only guess the intended input after some characters have been entered, not at the beginning of a word. For this reason, confusing or wrong word guesses are regularly displayed, distracting the user. If the system cannot associate an uncommon or new word with a dictionary entry although it has been fully entered, then the word has to be re-entered manually. The original input sequence was a waste of time in this case.

A system for text input must fulfil various requirements: First of all, the operation must be easy to learn and rapid input must be possible. The construction must be cost-efficient to produce and very robust, as mobile electronic devices are subject to strong shaking and hits as well as extreme changes of temperature (between 0 and 60 degrees Celsius).

The goal of the invention is to enable portable electronic devices with internal and/or external displays and a numeric keypad to accept input of arbitrary letter sequences, to show the characters immediately during text input, to reduce the required number of steps for text input while reducing the risk of typing errors and to keep production cost low.

The invention is based on the task to develop an apparatus for text input by means of single activations of keys of a numeric keypad and a method to process input pulses with an electronic controller during a text input with a numeric keypad of portable electronic devices with an internal and/or external display.

The task is solved as shown in the independent claims. The resources mentioned in the dependent claims are intended for the arrangement of the invention.

The invention shall be described in detail by reference to an example. The accompanying drawings show:

FIG. 1: the structure of the apparatus for text input according to the invention FIG. 2: an example of operating a key of the keypad to enter the letters "a", "b" and "c"

FIG. 3: a cross-section of a key activated with the finger on the left side (3*a*), in the center (3*b*) and on the right side (3*c*)

FIG. 4: examples for the user interface of an electronic device during text input FIG. 5: a table showing the association of letters to the digit keys depending on the position of the activation FIG. 6: Examples for a screen display during the input of special characters FIG. 7: an overview of suitable sensor types FIG. 8: a flow chart of the controller scanning the keyboard According to the invention, the keyboard consists of four components (FIG. 1), a keypad 11, a sensor matrix underneath the keypad 12 sensing the position of the key activation, a micro processor 13 and a display 14, where the writing position is marked by a cursor 15 during text input.

The keypad 11 consists of twelve keys. Ten of them are labelled with the digits 0 to 9 and eight of these are also labelled with the letters from the range A-Z. Two other keys are provided for input of special characters.

Ordinary keys close an electric contact whenever mechanical pressure is exerted on any point of their surface. The keys of the invention can also be used this way just like ordinary keys. In addition, the micro processor 13 can distinguish between different positions on the key surface where it has been activated. This allows to accept the left, center or right character of the key label depending on whether the left, center or right side of this key has been touched (FIG. 2).

As long as a key is held down, a candidate list 41 is visible (FIG. 4*a*). This candidate list displays the possible input alternatives and highlights the selected character (FIG. 4*b, c*). As long as the key is pressed, the position of the pressure can be changed, leading to a corresponding change in the display. Any input is only accepted when the key is released.

The letters of the alphabet are distributed among the numeric keys in a way just like common telephone keyboards, so that the keys with the digits 2 to 9 are all labelled with three letters; only the "q" and "y" must be accommodated additionally on the digit keys 7 and 9 (FIG. 5). Special characters and international letters like umlauts and accented characters can be selected via an alternate key 46. The changed key assignments resulting from this are indicated by a pop-up window on the display 14 (FIG. 6*a, b*). The proposed implementation features a lower-upper case shift key 45 and a numeric shift key 44 similar to common telephone keypads.

A wide range of sensor technologies may be used for this application, as shown in the table of FIG. 7. Both analog and digital sensors are suitable.

The invention offers a much faster input speed compared to the established multi-tap scheme with the numeric keys of a keypad. The apparatus for text input according to the invention is also easier to operate: The user is only required to tap on the desired letter, instead of tapping digit keys repeatedly.

The invention can utilize a feature of electronic keypads that has only been treated as an incidental side-effect until now. When they are being pressed, keys are marginally movable and can usually be tilted (pivoted) slightly to their sides. The angle of the exerted pressure can be measured with sensors and allows to select from multiple key allocations, in this case the letter assignments of a numeric keypad.

FIG. 1 shows the keypad 11. Normally such keys are used to enter the digits "0" to "9". During a text input, the same keypad is used to enter letters. The shown associations are standardized. From the outside, the keypad according to the invention looks similar to an ordinary telephone keypad.

The shape and the design of the key top can be varied without influencing their function.

FIG. 2*b* shows a key that is activated in the center. Accordingly, the middle position of the three choices "ABC", i.e. "B" is highlighted on the display. If the key is pressed on its left side (FIG. 2*a*), an "A" appears. A pressure on the right side of the key produces a "C" (FIG. 2*c*).

Especially with small keys it can be sensible to configure the key top as a small trough, concave from the left to the right side, i.e. with an edge at the left and right sides of the keys. This allows to feel out both the center of the keys as well as their edges and to activate them on their left or right side.

As long as digits are entered, the apparatus according to the invention acts exactly like a conventional numeric keypad. Every keypress leads to the input of the corresponding digit. The difference only becomes apparent when text is entered (FIG. 4). The display 14 expects letters to be entered at the cursor position 15. As long as no key is pressed, the candidate list 41 together with the highlighted candidate 42 is hidden.

Only after a key such as 43 is held down at a specific position, the candidate list 41 appears on the display corresponding to the letters printed onto the key surface. When the key 43 is pressed at its left edge, the candidate 42 is marked as an input choice on the left side of the list by highlighting with color or inverting. However, if the key is pressed in its center, the middle candidate appears (FIG. 4*b*). This is applied correspondingly for an activation on the right side of the key (FIG. 4*c*). When the finger is released from the key, the candidate list 41 disappears and the finally selected character 42 turns up at the cursor position 15.

The standardized association of letters to numeric keys assigns three letters to most digit keys. However, the keys "7" and "9" are each assigned four letters. The invention complies with this established arrangement in order to make a transition easier. But three positions are particularly fast to access, these are both sides of the keys and their center. This means that the letter "q" on the digit key "7" and the letter "y" on the digit key "9" are slightly more difficult to access (FIG. 5). As these letters are not so frequent, this assignment is still to be preferred against a non-standard arrangement.

The association of special characters to the numeric keys according to FIG. 6*a* and FIG. 6*b* is only one possible example. The established telephone keypads are common with different arrangements, the invention can accordingly vary like these. The arrangement should be easy to memorize and commonly used characters should be easy to access. So, FIG. 6*b* shows the "β" (German sharp s) and "$" (dollar character) on the same numeric key as the letter "s" for normal text input. Accented characters, parentheses etc. are intentionally assigned to the left and right edge of certain keys.

In order to activate the input of special characters according to FIGS. 6*a* and 6*b*, it is sufficient to press the alt key 46, "alt" standing for alternate key assignment. Pressing the left side of the key 46 leads to the input of punctuation characters according to FIG. 6*a*; pressing the right side leads to FIG. 6*b*.

The selected input mode is indicated by some help information (cheat sheet) 61 resp. 62 on the display 14. A subsequent activation of the alt key 46 toogles back to the normal letter input and the help information 61 resp. 62 vanishes.

The invention can be implemented by means of various sensor and switch types (FIG. 7). The most simple variant consists of conventional rocker switches 71 with three possible positions as listed in the table of FIG. 7. As the resolution is only three steps, the risk of typing errors is high and it is difficult to enter the letters "q" and "y". In addition, with this simple variant it is possible that either no or both contacts close the electric circuit which makes a correct interpretation impossible. Thus, conventional rocker switches with multiple click thresholds only deliver a makeshift solution for this application.

Two force sensing resistors 72 (FSR) located underneath either side of each key allow an analysis with a much higher resolution. However, the FSR does not measure the angle of the applied force, but the applied force. The angle of the pressure must be computed with software from these force sensing data. This is complicated and likely to produce errors.

A strip-formed FSR 73 or linear potentiometer can detect the contact position of a key directly. Just like strain gauges 74, this sensor type delivers analog data that must be digitized and transformed to values indicating the pressure angle. Hall sensors 75 can measure the distance of the key edges to the printed circuit board 25 precisely, but they can only be integrated into a keyboard at a high cost in terms of production efforts.

An innovative, digital angle sensor 76 is perfect for this application. Its digital measurement readings correspond directly with the angle of the keys. Its precision is scalable depending on the requirements. In its simplest form, two contacts of this angle sensor can distinguish four cases and deliver a 2 bit resolution. Then, the idle condition of the keys corresponds to the status zero; the activation of the left resp. right side of the key sets the left resp. right bit; and an activation in the center closes both contacts and sets both bits of the result.

Figure 8:
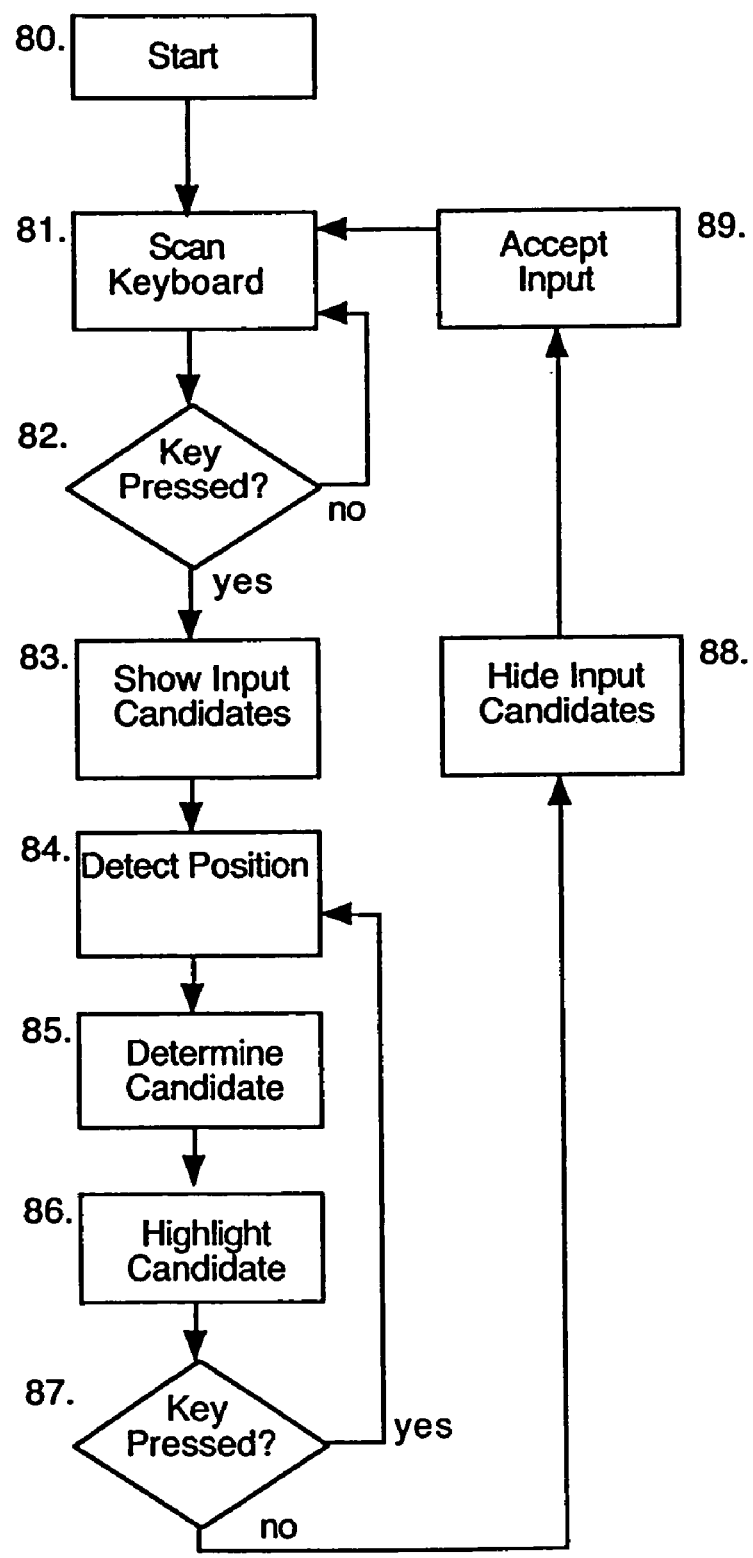

FIG. 8 displays an algorithm for the interactive input of characters according to the invention. After the start 80, the keypad is scanned several times per second (step 81). If a key activation is detected during step 82, the corresponding input candidates appear (step 83). Now the touch position on the key is computed from the sensor measurements (84). On the basis of this position, the procedure according to the invention determines the associated candidate (step 85) and highlights it (step 86). Steps 84 to 86 are repeated as long as the key is pressed, and the display of the current candidate is updated if necessary. Only after the key is released (after step 87), the candidate display vanishes (step 88) and the input is accepted (step 89). This is repeated as long as input of text is possible.

Compared to predictive text input, this solution has the crucial advantage that no electronic dictionaries are required and it is thus suitable for arbitrary input sequences. Even names, email addresses, foreign words etc. that consistently lead predictive text input systems into failure can be entered fluently with the invention.

The new procedure does not require extra devices as it can easily be integrated into existing designs. The accustomed letter arrangement makes the transition easier for device manufacturers and for users.

The text input according to the invention is much faster and more reliable than the conventional method of multi-tapping numeric keys. Its user interface is also much easier to conceive. Users just need to point the finger at the desired letter and press the corresponding key at this position.

The invention claimed is:

1. Method for processing input impulses during text input, the method comprising the step of:
    providing an electronic device having an input device for inputting text, wherein the input device is selected from the group consisting of a first input device and a second input device;
    inputting text with the first input device or the second input device;
    wherein the first input device inputs text by actuating keys of a numeric keypad of the electronic device, wherein underneath each key of the keypad sensors are located that measure a variable angle of an actuated key of the numeric keypad over a range of motion for the actuated key, and wherein a micro processor of the electronic device is programmable to assign a chosen input alternative based on the measured variable angle of the actuated key of the numeric keypad,
    wherein the second input device inputs text by actuating keys of a numeric keypad of the electronic device, wherein the keypad contains keys with integrated sensors or switches measuring a user's finger position, wherein each key comprises a soft, deformable material built either from an electrically conductive material that changes its resistance upon pressure and has a high electrical resistance, or built with multiple layers, one layer consisting of an electrically conductive material changes its resistance upon pressure and has a high electrical resistance, where there are sensors or switches integrated into each key that measure the position of the actuated key of the keypad, and wherein a micro processor is provided that associates a determined position to one of one or many input alternatives,
    displaying a list with possible input alternatives on a connected display of the electronic device, where exactly one input alternative that corresponds to the measured variable angle of the actuated key is highlighted and a change of the variable angle of the actuated key allows the highlighting on the listed input alternatives to move to a second input alternative, and after release of the actuated key, a finally highlighted input alternative is registered as a keypad input, wherein the finally highlighted input alternative is an input alternative highlighted immediately preceding the release of the actuated key; and, optionally,
    entering special characters by pressing an activation key of the first or second input device, leading to a display with an overview of all keys and their corresponding input choices, and then pressing a second key, whereas said overview disappears and the corresponding character from the overview is accepted as the keypad input.

2. The method according to claim 1, wherein the sensors underneath each key of the keypad of the first input device are digital angle sensors.

3. Method for processing input impulses during text input, the method comprising the step of;
    providing an electronic device having an input device with a numeric keypad;
    inputting text by actuating keys of the numeric keypad of the electronic device, wherein underneath each key of the numeric keypad sensors are located that measure a variable angle of an actuated key of the keypad over a range of motion for the actuated key, and wherein a micro processor of the electronic device is programmable to assign a chosen input alternative based on the measured variable angle of the actuated key,
    displaying a list with possible input alternatives on a connected display of the electronic device, where exactly one input alternative that corresponds to the measured variable angle of the actuated key is highlighted and a change of the variable angle of the actuated key allows the highlighting on the listed input alternatives to move to a second input alternative, and after release of the actuated key, a finally highlighted input alternative is registered as a keypad input, wherein the finally highlighted input alternative is an input alternative highlighted immediately preceding the release of the actuated key.

4. The method according to claim 3, wherein the numeric keypad comprises often keys that are labeled with the digits 0 to 9 and eight of them are additionally labeled with the letters A to Z.

5. The method according to claim 3, wherein the numeric keypad equipped with the digits and letters is intended for use with mobile electronic devices.

6. The method according to claim 3, wherein the micro processor is equipped with an interface to the display, wherein the numeric keypad constitutes one functional unit together with the micro processor and the display.

7. The method according to claim 3, wherein each key of the numeric keypad exhibits a concave key surface running from the left to the right side.

8. The method according to claim 3, wherein the numeric keypad comprises of twelve keys, two keys being designated for toggling to special characters.

9. The method according to claim 3, wherein the sensors are composed of rocker switches, each key providing three activation positions that correspond to a pressure on the left side of this key, in the center of this key and the right side of this key.

10. The method according to claim 3, wherein the sensors are composed of pressure sensors designed as two pressure-sensitive force-sensing resistors per key that measure the applied force on the left and right side of a slightly movable key, making it possible to determine the position of the finger from the relation of the two measured values.

11. The method according to claim 3, wherein the sensors are composed of pressure sensors designed as a pressure-sensitive force-sensing resistors per key in the form of a strip that measures the position of applied force of the convex shaped bottom side of a slightly movable key on a base plate, making it possible to determine the position of the finger.

12. The method according to claim 3, wherein the sensors are composed of two strain gauges per key that measure the force applied to the left and right side of a slightly movable key in order to determine the finger position.

13. The method according to claim 3, wherein the sensors are composed of two hall sensors per key that measure the distances of a slightly movable key to a base plate in order to determine the finger position from the ratio of the measured values.

14. The method according to claim 3, wherein the sensors are composed of angle sensors formed by an electrically conductive convex bottom side of a key and multiple conductive paths on a printed circuit board, where an activation position of the key is computed by a pattern recognition from a combination of closed contacts on the printed circuit board.

15. The method according to claim 3, wherein the sensors are composed of a membrane keyboard that contains one contact each for every letter of the corresponding key label, where these contacts identified with letters are combined in groups during numeric input, while these contacts are evaluated individually during text input.

16. The method according to claim 3, further comprising: means for inputting diacritical characters via a first key and a second key of the numeric keypad.

17. The method according to claim 3, wherein the sensors measuring the angle of the activated key are located individually underneath each key in case of an external sensor implementation or inside each key at the left and right side of each key in case of an integrated sensor implementation.

18. The method according to claim 3, wherein the keys inside the keypad are tiltable against a pivot that lies parallel to the key surface.

19. The method according to claim 3, wherein the sensors underneath each key of the keypad of the input device are digital angle sensors.

20. The method according to claim 16, wherein the diacritical characters are umlaut characters and/or accented characters.

21. Method for processing input impulses during text input, the method comprising the step of:
   providing an electronic device having an input device for inputting text, wherein the input device is selected from the group consisting of a first input device and a second input device;
   inputting text via the first input device or the second input device;
   wherein the first input device inputs text by actuating keys of a numeric keypad of the electronic device, wherein underneath each key of the keypad sensors are located that measure a variable angle of an actuated key of the keypad actuated by a user's finger position over a range of motion for the actuated key, and wherein a micro processor of the electronic device is programmable to assign a chosen input alternative based on the measured variable angle of the activated key of the numeric keypad,
   wherein the second input device inputs text by actuating keys of a numeric keypad of the electronic device, wherein the keypad contains keys with integrated sensors or switches measuring the user's finger position, the keys consisting of a soft, deformable material and are built either from an electrically conductive material that changes its resistance upon pressure and has a high electrical resistance, or built with multiple layers, one layer consisting of an electrically conductive material changes its resistance upon pressure and has a high electrical resistance, where there are sensors or switches integrated into the keys that measure the position of an actuated key of the keypad, and wherein a micro processor is provided that associates the determined position of the actuated key to one of one or many input alternatives; and
   displaying a list with possible input alternatives on a connected display of the electronic device, where exactly one input alternative that corresponds to the measured variable angle of the actuated key is highlighted and a change of the variable angle of the actuated key allows the highlighting on the listed input alternatives to move to a second input alternative, and after release of the actuated key, a finally highlighted input alternative is registered as a keypad input, wherein the finally highlighted input alternative is an input alternative highlighted immediately preceding the release of the actuated key,
   wherein the micro processor computes a tilt of the actuated key and therefore the users' finger position regularly with a frequency of 10 to 50 Hz from relative measurements of two sensors on a left and right side that are activated proportionally to a pressure angle of the actuated key.

22. The method according to claim 21, wherein the sensors underneath each key of the keypad of the first input device are digital angle sensors.

* * * * *